US008682524B2

(12) United States Patent
Kitagawa

(10) Patent No.: US 8,682,524 B2

(45) Date of Patent: Mar. 25, 2014

(54) VIEW CONTROL SYSTEM AND VIEW CONTROL METHOD

(75) Inventor: Eiji Kitagawa, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 467 days.

(21) Appl. No.: 12/488,747

(22) Filed: Jun. 22, 2009

(65) Prior Publication Data

US 2010/0030424 A1 Feb. 4, 2010

(30) Foreign Application Priority Data

Jul. 30, 2008 (JP) ................................ 2008-196944

(51) Int. Cl.
*G06F 7/00* (2006.01)

(52) U.S. Cl.
USPC ................. 701/36; 701/1; 455/566; 345/676; 345/530; 345/418

(58) Field of Classification Search
USPC .......... 701/1, 36; 455/566; 345/418, 676, 530
See application file for complete search history.

(56) References Cited

U.S. PATENT DOCUMENTS

| | | | | |
|---|---|---|---|---|
| 6,163,779 | A * | 12/2000 | Mantha et al. | 715/234 |
| 6,608,556 | B2 * | 8/2003 | De Moerloose et al. | 340/501 |
| 6,668,221 | B2 * | 12/2003 | Harter et al. | 701/36 |
| 6,701,154 | B2 * | 3/2004 | Ito | 455/456.1 |
| 6,804,537 | B1 * | 10/2004 | Fujii | 455/557 |
| 2002/0070852 | A1 * | 6/2002 | Trauner et al. | 340/438 |
| 2002/0085043 | A1 * | 7/2002 | Ribak | 345/810 |
| 2002/0156832 | A1 * | 10/2002 | Duri et al. | 709/203 |
| 2005/0038573 | A1 * | 2/2005 | Goudy | 701/1 |
| 2005/0055154 | A1 | 3/2005 | Tanaka et al. | |
| 2005/0179827 | A1 * | 8/2005 | Scharenbroch et al. | 349/16 |
| 2006/0014523 | A1 * | 1/2006 | Reilly | 455/412.1 |
| 2007/0002032 | A1 * | 1/2007 | Powers et al. | 345/204 |
| 2007/0067415 | A1 | 3/2007 | Kawaguchi | |
| 2007/0220145 | A1 | 9/2007 | Kozakura et al. | |
| 2010/0169472 | A1 * | 7/2010 | Okamoto et al. | 709/224 |

FOREIGN PATENT DOCUMENTS

| | | |
|---|---|---|
| DE | 101 44 752 | 3/2003 |
| DE | 103 39 634 | 3/2005 |
| JP | 09-166450 | 6/1997 |
| JP | 2001-114029 | 4/2001 |
| JP | 2002-029325 | 1/2002 |
| JP | 2003-131791 | 5/2003 |

(Continued)

OTHER PUBLICATIONS

Product Announcement, Supplier technology 2001 (automaker's use of new technologies from suppliers), Oct. 2000, Automotive Engineering International, v. 108, p. 108.*

(Continued)

*Primary Examiner* — Thomas Black
*Assistant Examiner* — Sara Lewandroski
(74) *Attorney, Agent, or Firm* — Staas & Halsey LLP

(57) ABSTRACT

A view control system is communicably connected to a display device for displaying data in accordance with an information resource. The view control system includes a view control device. The view control device includes a regulation determiner, a view regulator, and a resource data sender. The regulation determiner determines whether to regulate visible output of the information resource. The view regulator associates regulatory data with the information resource upon determining to regulate visible output of the information resource. The resource data sender sends resource data including the information resource, associated regulatory data, and a message conveying that visible output of the information resource is regulated. Either the message or data generated in accordance with the information resource is sent to the display device.

8 Claims, 15 Drawing Sheets

(56) References Cited

FOREIGN PATENT DOCUMENTS

| | | |
|---|---|---|
| JP | 2004-038775 | 2/2004 |
| JP | 2005-075314 | 3/2005 |
| JP | 2005-174273 | 6/2005 |
| JP | 2007-083873 | 4/2007 |
| JP | 2007-249657 | 9/2007 |

OTHER PUBLICATIONS

Murphy, Keep your eyes on the road 'multi-tasking' drivers will have even more things to do, May 1998, WardsAuto.*

Extended European Search Report for corresponding European Application 09163645.6-1254; dated Dec. 14, 2010.

Japan Automobile Manufacturers Association, "Guideline for Image Display Apparatuses, v3.0".

Japan Automobile Manufacturers Association, "Guideline for Invehicle Systems Apparatuses, v3.0".

Notification of Reasons for Refusal issued Jul. 3, 2012 in corresponding Japanese Patent Application No. 2008-196944 (7 pages) (4 pages English translation).

Japanese Office Action issued Oct. 2, 2012 in corresponding Japanese Patent Application No. 2008-196944 (3 pages) (2 pages English translation).

* cited by examiner

```
    <html>
    <head>・・・</head>
    <body>
    <h1> ABC THEATER Screen Information </h1>
    Enjoy new movies of topic in a gorgeous seat of the theater near the XYZ station.
    Free 100-car parking is available.<br/>
D10 <a href="http://example.com/ABC_theater/access_map.png">access map</a><br/>
    <br/>
    <h2> Screen Schedule for 1/1 – 2/15 </h2>
D1  <h3>"(title1)"</h3>
D2  <a href="http://example.com/ABC_theater/movie1_cm.html">movie CM video</a><br/>
    <a href="http://example.com/ABC_theater/movie1.html">introduction in detail</a><br/>
    <br/>
    <h2> Screen Schedule for 2/16 – 4/15 </h2>
D3  <h3>"(title2)"</h3>
D4  <a href="http://example.com/ABC_theater/movie2_cm.asf">movie CM video</a><br/>
    <a href="http://example.com/ABC_theater/movie2.html">introduction in detail</a><br/>
    </body>
    </html>
```

| ID (102) | LOCATION DATA (104) | LINKED SITE DATA (106) |
|---|---|---|
| 1 | ROW 6, COLUMN 1 | http://example.com/ABC_theater/access_map.png |
| 2 | ROW 10, COLUMN 1 | http://example.com/ABC_theater/movie1_cm.html |
| 3 | ROW 11, COLUMN 1 | http://example.com/ABC_theater/movie1.html |
| 4 | ROW 15, COLUMN 1 | http://example.com/ABC_theater/movie2_cm.asf |
| 5 | ROW 16, COLUMN 1 | http://example.com/ABC_theater/movie2.html |

```
<html>
<head>・・・</head>
<body>
<h1>title1</h1>
<object classid="CLSID:22D6F312-B0F6-11D0-94AB-0080C74C7E95">
<param name="FileName" value="http://example.com/ABC_theater/movie1_cm.asf">
<param name="AutoStart" value="true">
</object>
</html>
```

```
<html>
<head>···</head>
<body>
<h1>title1</h1>
        An epic suspense film in topic produced over 3 years by the worldwide master Kurosawa.
The hottest film now generating box-office revenue of 50 million dollars in the U.S. <br/>
        The appearance of the hero to straighten out problems one after another by a
superb judgment while being up against a wall makes a deep impression to audience
with a certain kind of exhilaration. ----By all means, I'd like to visit the theater to enjoy
the film on the big screen.
</html>
```

```
<html>
<head>···</head>
<body>
<h1>title2</h1>
        To be assigned.
</html>
```

FIG. 6

```
<html>
<head>....</head>
<body>
<h1> ABC THEATER Screen Information </h1>
    Enjoy new movies of topic in a gorgeous seat of the theater near the XYZ station.
Free 100-car parking is available.<br/>
<a href="http://example.com/ABC_theater/access_map.png">access map</a><br/>
<br/>
<h2> Screen Schedule for 1/1 - 2/15 </h2>
<h3> "(title1)" </h3>
<!--start of UNAVAILABLE WHILE MOVING--><a href="http://example.com/ABC_theater
/movie1_cm.html">movie CM video</a><!--end of UNAVAILABLE WHILE MOVING--><br/>
<!--start of UNAVAILABLE WHILE MOVING--><a href="http://example.com/ABC_theater
/movie1.html">introduction in detail</a><!--end of UNAVAILABLE WHILE MOVING--><br/>
<br/>
<h2> Screen Schedule for 2/16 – 4/15 </h2>
<h3> "(title2)" </h3>
<!--start of UNAVAILABLE WHILE MOVING--><a href="http://example.com/ABC_theater
/movie2_cm.asf">movie CM video</a><!--end of UNAVAILABLE WHILE MOVING--><br/>
<a href="http://example.com/ABC_theater/movie2.html">introduction in detail</a><br/>
</body>
</html>
```

FIG. 7

ABC THEATER Screen Information
  Enjoy new movies of topic in a gorgeous seat of the theater near the XYZ station. Free 100-car parking is available.
  access map — D8

Screen Schedule for 1/1 - 2/15
"(title1)"
movie CM video
introduction in detail — D8

Screen Schedule for 2/16 – 4/15
"(title2)"
movie CM video
introduction in detail — D8

ABC THEATER Screen Information
  Enjoy new movies of topic in a gorgeous seat of the theater near the XYZ station. Free 100-car parking is available.
  access map

D8

Screen Schedule for 1/1 - 2/15
"(title1)"
movie CM video (UNAVAILABLE WHILE MOVING)
introduction in detail (UNAVAILABLE WHILE MOVING)

D9

Screen Schedule for 2/16 – 4/15
"(title2)"
movie CM video (UNAVAILABLE WHILE MOVING)
introduction in detail

D8

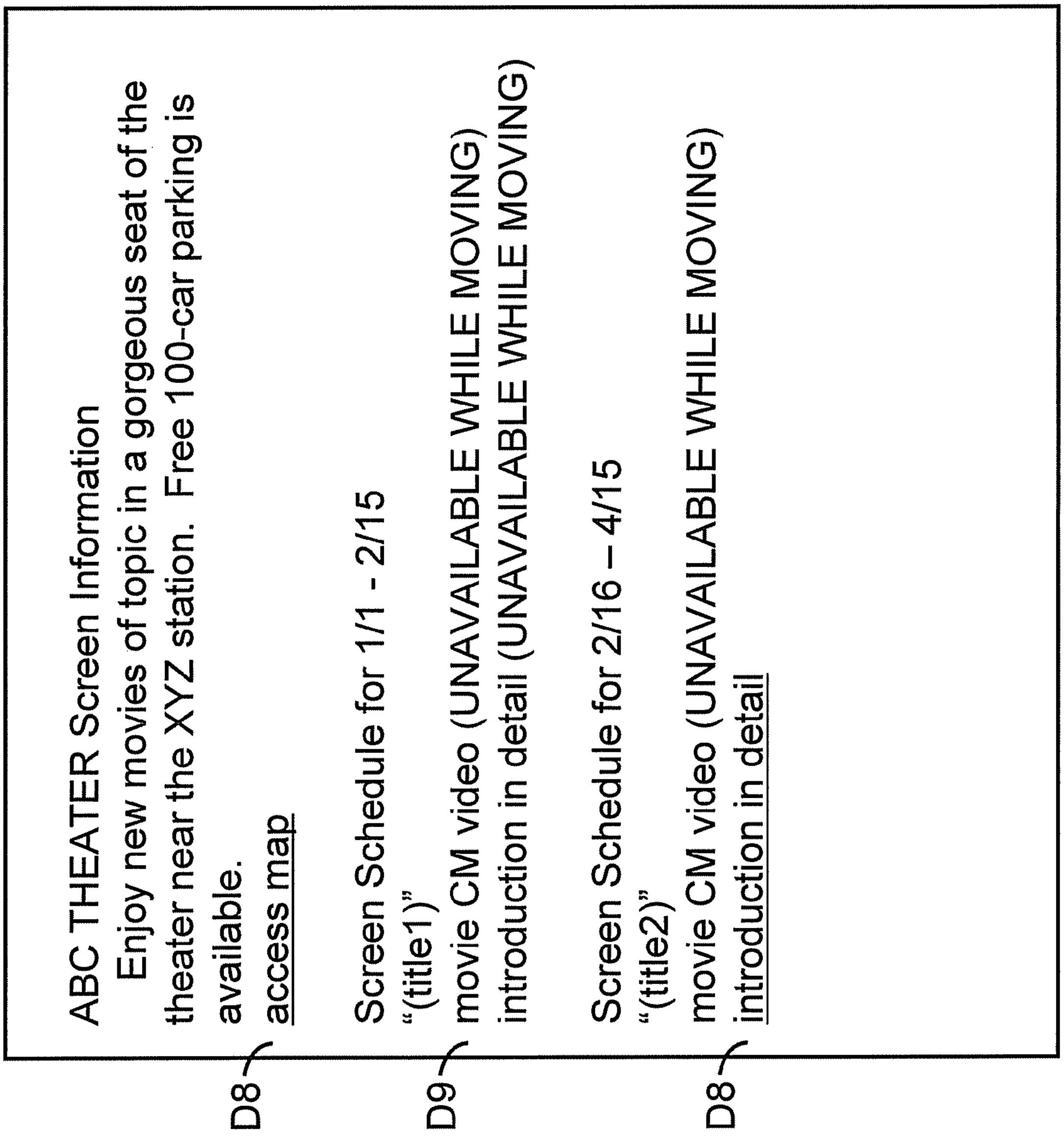

FIG. 9

VIEW CONTROL SYSTEM AND VIEW CONTROL METHOD

CROSS-REFERENCE TO RELATED APPLICATIONS

This application is based upon and claims the benefit of priority of the prior Japanese Patent Application No. 2008-196944, filed on Jul. 30, 2008, the entire contents of which are incorporated herein by reference.

FIELD

The embodiments discussed herein are related to a view control system which controls visible output of an information resource on a mobile viewer.

BACKGROUND

The mobile viewers include, for example, car navigation systems, in-vehicle television receivers, mobile terminals, and cell phones. The mobile viewers may be watched by drivers of vehicles, steerers of ships, or pilots of airplanes, etc. For example, a driver may get various kinds of information such as a route to a destination, a traffic situation on the route, and terrestrial broadcasting, in the vehicle.

The mobile viewers may be connected to the Internet via a cell phone for example, to display view data generated in accordance with a structured document downloaded through the Internet and analyzed by using a web browser. The mobile viewers may further display view data including a still picture or a motion picture generated in accordance with an information resource (hereinafter also referred to as "browsing data") such as another structured document, a still picture file, and a motion picture file, downloaded from a site (referred to as a linked site) indicated by link data included in the previously received structured document (see Japanese Laid-Open Patent No. 9-166450, for example).

However, the driver needs to confirm the safety around the vehicle and may not keep his eyes on the screen during driving. Thus, watching and operating the mobile viewers increase driver's burden. Because of this, the Japan Automobile Manufacturers Association has defined screen images that are not preferable to be displayed in a moving vehicle in "Guideline for Image Display Apparatus" (hereinafter referred to as "JAMA guideline".

SUMMARY

According to an aspect of the present invention, provided is a view control system communicably connected to a display device for displaying data in accordance with an information resource. The view control system includes a view control device.

The view control device includes a regulation determiner, a view regulator, and a resource data sender. The regulation determiner determines whether to regulate visible output of the information resource. The view regulator associates regulatory data with the information resource upon determining to regulate visible output of the information resource. The resource data sender sends resource data including the information resource, associated regulatory data, and a message conveying that visible output of the information resource is regulated. Either the message or data generated in accordance with the information resource is sent to the display device.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 2 is a diagram illustrating an example of a description of a structured document;

FIG. 3 is a diagram illustrating an example of a link data table according to a first embodiment of the present invention;

FIGS. 4 to 7 are diagrams each of which illustrating an example of a description of a structured document;

FIGS. 8 and 9 are diagrams each of which illustrating an example of a displayed screen;

DESCRIPTION OF EMBODIMENTS

When a driver needs to operate, while driving the vehicle, view data generated from a large quantity of browsing data such as a document written in a small-sized character on each screen, a document including a large number of characters per screen, and a picture from a motion picture file, the driver may not pay careful attention to surroundings of the vehicle. It is dangerous. Accordingly, it is preferable for an in-vehicle device to avoid displaying view data generated in accordance with a large quantity of browsing data to the driver at least during driving.

The JAMA guideline is not enforceable to information providers and thus may not surely control a target screen. Further, the JAMA guideline does not regulate general web sites that may also be browsed outside the vehicle.

Therefore, the driver displays view data generated in accordance with browsing data stored in a linked site on a screen one after another and determines whether to operate during driving. As a result, a large burden of operation is placed on the driver. Further, the driver selects browsing data that seems operable during driving among from browsing data stored in plural linked sites by guess and displays view data of the selected browsing data on a screen. Thus, the driver has difficulty in viewing the screen during driving. As a result, the driver may not get information speedily.

First Embodiment

Figure 1:
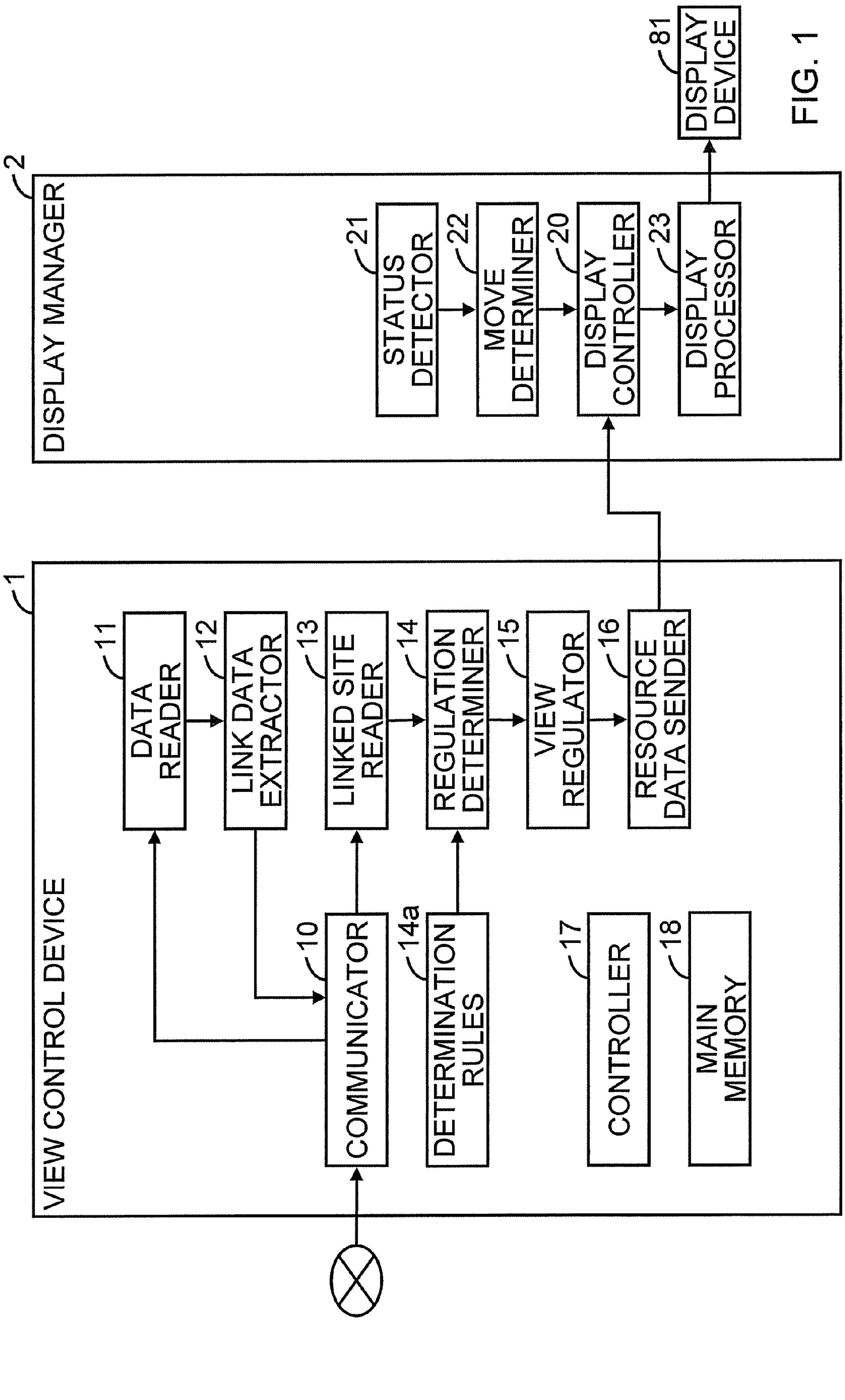
FIG. 1 is a block diagram illustrating an example of a configuration of a view control system according to a first embodiment of the present invention.

Hereinafter, a view control system will be discussed with reference to the accompanying drawings. FIG. 1 is a block diagram illustrating an example of a configuration of a view control system according to a first embodiment of the present invention. The view control system according to the first embodiment of the present invention is a view control device 1 illustrated in FIG. 1.

The view control device 1 is built into, for example, an in-vehicle device such as a car navigation system or an in-vehicle television receiver, a portable terminal device such as a cell phone, or an information processing apparatus such as a control server installed in a particular control center. The view control device 1 is connected to a communication network to download a structured document and browsing data on the communication network in response to a download request from a driver. The communication network in the first embodiment of the present invention corresponds, for example, to computer networks mutually connected using the Internet protocol technique.

Figure 8:
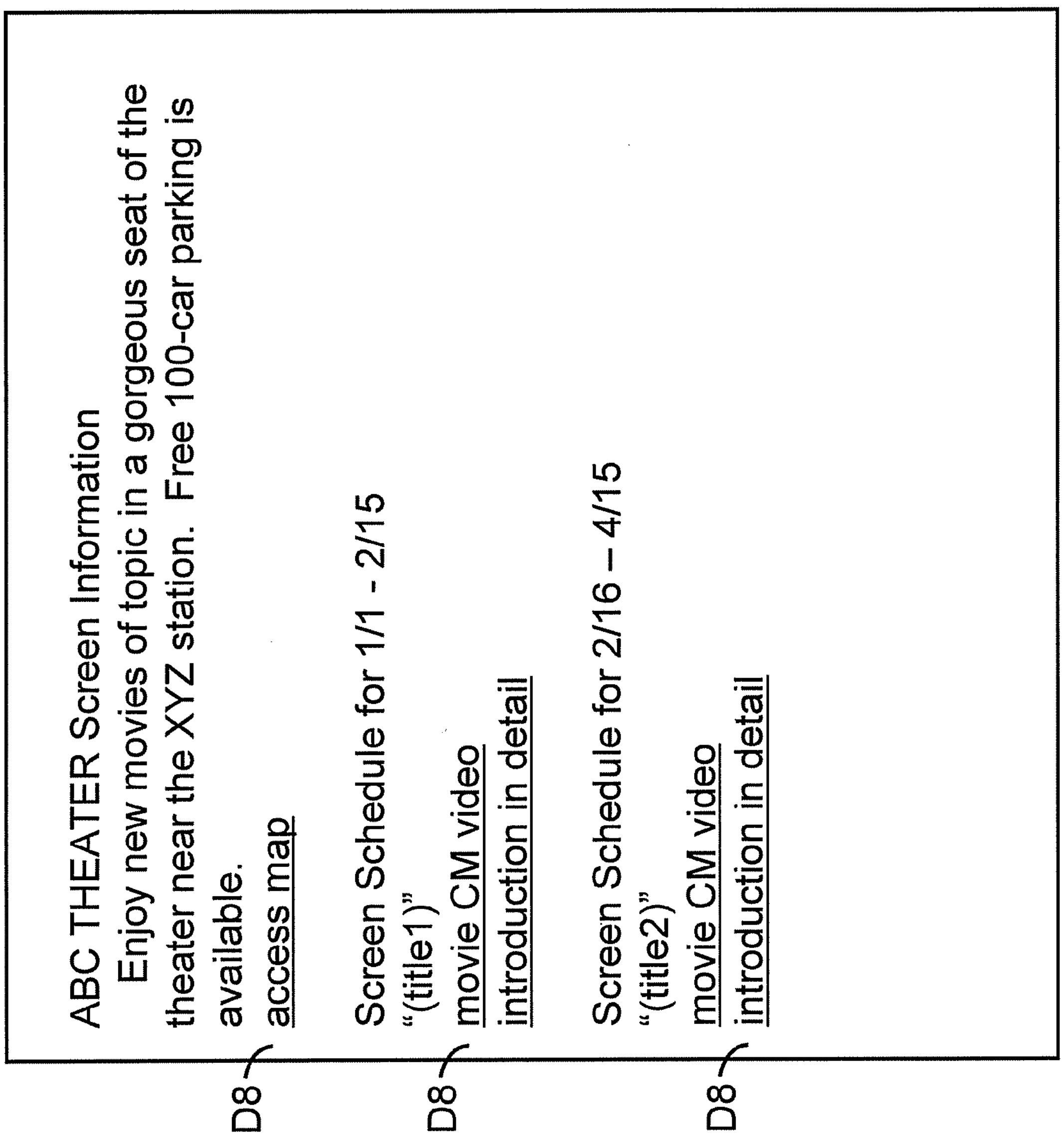

FIG. 2 is a diagram illustrating an example of a description of a structured document. FIG. 3 is a diagram illustrating an example of a link data table according to a first embodiment of the present invention. FIGS. 4 to 7 are diagrams each of which illustrating an example of a description of a structured document. FIGS. 8 and 9 are diagrams each of which illustrating an example of a displayed screen. A structured document consists of a plurality of document data linked to one another by hyperlinks. The structured document is written in the Hyper Text Markup Language (HTML) or other such languages. The description of a structured document is analyzed by using a web browser which generates a screen image in accordance with an analysis result. The structured document contains link data. The link data relates to browsing data, that is, a linked site indicated by the link data stores browsing data.

The view control device 1 includes a communicator 10, a data reader 11, a link data extractor 12, a linked site reader 13, a regulation determiner 14, determination rules 14*a*, a view regulator 15, a resource data sender 16, a controller 17, and a main memory 18. These units are connected with one another through a communication line (not illustrated).

The communicator 10 establishes connection to the communication network. The data reader 11 reads various kinds of data through the connected communication network. The link data extractor 12 extracts link data from the various kinds of data read by the data reader 11. The linked site reader 13 reads browsing data stored in a linked site indicated by the link data extracted by the link data extractor 12. The regulation determiner 14 determines whether to regulate, in a moving vehicle, visible output of the browsing data read by the linked site reader 13. The determination rules 14*a* are rules for determination performed by the regulation determiner 14. The view regulator 15 associates regulatory data with the browsing data. The resource data sender 16 outputs a structured document to a display manager 2. The controller 17 controls each unit in the view control device 1. The main memory 18 stores data generated by the controller 17 during executing processes.

The communicator 10 establishes connection to a communication network, in response to a download request by a driver, to download structured documents or browsing data on the communication network one by after. The communicator 10 outputs downloaded structured documents or browsing data to the data reader 11 or the linked site reader 13.

The data reader 11 successively receives and stores the structured document output from the communicator 10. The data reader 11 successively reads the stored structured document and outputs the read structured document to the link data extractor 12. FIG. 2 illustrates an example of a description of a downloaded structured document.

The link data extractor 12 analyzes description of the structured document output from the data reader 11 by using a web browser to extract link data with Uniform Resource Locator (URL) format contained in the HREF element (<a href=" ">) in tag A which is a description for link written in the HTML. For example, in the structured document illustrated in FIG. 2, D1 to D4 and D10 correspond to link data. Each time link data is extracted, the link data extractor 12 stores extracted link data in a link data table T in association with location data indicative of a location of an element of the extracted link data in the structured document. The link data table T stores identification (ID) 102, location data 104, and linked site data 106 in association with one another (see FIG. 3). The link data extractor 12 outputs generated link data table T to the linked site reader 13.

The linked site reader 13 receives the link data table T output from the link data extractor 12 and successively downloads, using HyperText Transfer Protocol (HTTP) or other such communication protocols, browsing data stored in a linked site indicated by link data stored in the received link data table T. The linked site reader 13 outputs the read browsing data to the regulation determiner 14. In the first embodiment of the present invention, a discussion will be made on an example in the case that the downloaded browsing data is another structured document.

The regulation determiner 14 successively receives the browsing data output from the linked site reader 13. The regulation determiner 14 determines whether to regulate, in a moving vehicle, visible output of the received browsing data in accordance with the determination rules 14*a*. The regulation determiner 14 outputs a determination result to the view regulator 15.

The determination rules 14*a* are predefined by an administrator. For example, the determination rules 14*a* may comply with the JAMA guideline. The determination rules 14*a* may define cases in that browsing data is preferably regulated to be visually displayed while a vehicle is moving. Such cases include: the browsing data is a motion picture file of television broadcasting or a motion picture file for motion picture playback or Digital Versatile Disc (DVD) playback; the browsing data is a motion picture file on the Internet or the like; the browsing data is information about an address, a phone number, or an introduction to a restaurant, a hotel, etc.; the browsing data consists of characters more than a threshold value and is dynamically displayed; and the browsing data consists of characters smaller than a threshold size. The determination rules 14*a* may be appropriately updated in accordance with revision of the traffic regulations or development in individual knowledge as to security.

The regulation determiner 14 determines to regulate visible output of the browsing data in a moving vehicle when, for example, an execution program specified by the CLASSID element (see D5 in FIG. 4 for example) in an object tag (<object classid=" ">), which is link data described in another structured document (document data written in the HTML) which is browsing data stored in a linked site, is application software for motion picture playback. When the CLASSID element is "22D6F312-B0F6-11D0-94AB-0080C74C7E95", for example, the execution program is application software "Microsoft Windows (registered trademark) MEDIA Player 6.3" for motion picture playback.

The regulation determiner 14 also determines to regulate visible output of the browsing data in a moving vehicle when, for example, the number of characters in the main body (see D6 in FIG. 5 for example) described in document data written in the HTML, which is browsing data stored in a linked site, exceeds a threshold value. On the other hand, when the number of characters in the main body (see D7 in FIG. 6 for example) described in the document data is equal to or less than the threshold value, the regulation determiner 14 determines to permit visible output of the browsing data in a moving vehicle. The threshold value may be predefined by an administrator in consideration of a quantity of information that would cause negligent driving. The regulation determiner 14 may store the threshold value.

The regulation determiner 14 also determines to regulate visible output of the browsing data in a moving vehicle when, for example, browsing data stored in a linked site is a motion picture file.

The view regulator 15 receives the determination result output from the regulation determiner 14, and associates regulatory data with the structured document when the received determination result requires regulation, in a moving vehicle, of visible output of the browsing data stored in the linked site. The view regulator 15 adds a comment like "start of UNAVAILABLE WHILE MOVING" and "end of UNAVAILABLE WHILE MOVING" before and after the link data for the target linked site of regulation as HTML comments, for example (see R in FIG. 7 for example).

The resource data sender 16 includes, for example, a modem connectable to the Internet or a near field communication device using an infrared or Bluetooth (registered trademark) communication. The resource data sender 16 may output the structured document (see FIG. 7 for example) associated with the regulatory data by the view regulator 15 or the structured document and the link data table T to the display manager 2. The resource data sender 16 may also output the structured document (see FIG. 2 for example) not associated with regulatory data by the view regulator 15 to the display manager 2. The resource data sender 16 may also output the browsing data to the display manager 2.

The display manager 2 corresponds to, for example, a main body of a car navigation system or a main body of an in-vehicle television receiver. The display manager 2 includes a display controller 20, a status detector 21, a move determiner 22, and a display processor 23. The individual units are connected with one another through a communication line.

The display controller 20 selects an appropriate one from plural kinds of structured documents received from the view control device 1. The status detector 21 detects a status of the vehicle (referred to as a vehicle status). The move determiner 22 determines whether the vehicle is moving in accordance with detected vehicle status. The display processor 23 sends data described in the structured document to a display device 81 mounted on the vehicle.

The status detector 21 corresponds to, for example, a speed sensor (not illustrated) which detects a pulse signal for detecting a vehicle speed. The speed sensor is originally designed to output detected pulse signal to a speed meter in front of the driver's seat to display the vehicle speed. In the first embodiment of the present invention, the speed sensor also outputs, as the status detector 21, the detected pulse signal to the move determiner 22.

The move determiner 22 measures a pulse interval of the pulse signal received from the status detector 21 to determine whether the measured pulse interval is shorter than a threshold value, for example. When it is determined that the pulse interval is longer than or equals to the threshold value, the move determiner 22 determines that the vehicle is stopped and updates a status flag indicative of the vehicle status to represent "stopped". When it is determined that the pulse interval is shorter than the threshold value, the move determiner 22 determines that the vehicle is moving and updates the status flag to represent "moving". The move determiner 22 outputs a determination result to the display controller 20. The threshold value may be predefined by an administrator in consideration of collision energy of a vehicle. The move determiner 22 may store the threshold value and the status flag.

The display controller 20 includes, for example, a modem connectable to the Internet or a near field communication device using an infrared or Bluetooth communication. The display controller 20 receives and stores data such as a structured document output from the resource data sender 16 of the view control device 1. The display controller 20 also receives the determination result output from the move determiner 22. When the display controller 20 receives a determination result indicating that the vehicle is stopped, the display controller 20 reads the structured document not associated with regulatory data and outputs the read structured document to the display processor 23. When the display controller 20 receives a determination result indicating that the vehicle is moving, the display controller 20 reads the structured document associated with regulatory data and outputs the read structured document to the display processor 23.

The display processor 23 analyzes, for example, a description of the structured document by using a web browser to generate a screen image in accordance with the analysis result. The display processor 23 also activates, in response to a request, application software for motion picture playback on the web browser and analyzes a motion picture file (browsing data) by using the activated application software to generate a screen image. The display device 81 may include a liquid crystal panel and display received view data of the screen image thereon.

When the display processor 23 receives a structured document not associated with regulatory data from the display controller 20, the display processor 23 analyzes the received structured document by using a web browser and generates a screen image to be displayed. On the display screen, characters indicating link data described in the structured document are displayed as underlined characters D8 (see FIG. 8). As a result, a driver may enter a request to download browsing data stored in a linked site by selecting the underlined characters D8. When the display processor 23 receives a structured document associated with regulatory data from the display controller 20, the display processor 23 analyzes the received structured document by using a web browser and generates a screen image to be displayed. On the display screen, characters D9 including characters indicating link data for the target linked site of regulation and "UNAVAILABLE WHILE MOVING" are displayed in addition to the underlined characters D8 (see FIG. 9). Thus, the driver may learn of the browsing data regulated to be displayed.

Figure 10:
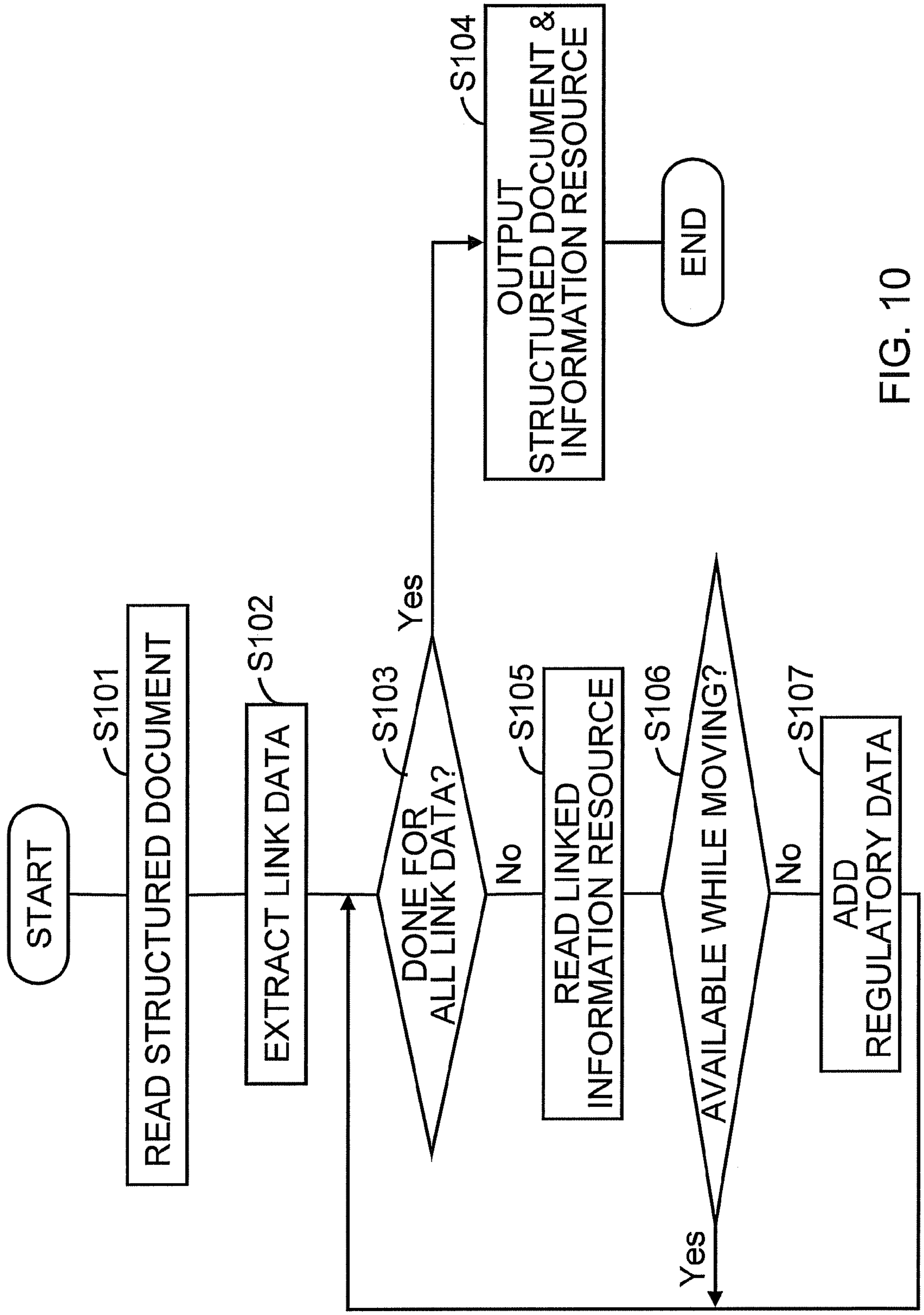
FIG. 10 is an operation chart illustrating an operation flow of an example of a view control process executed by a view control system according to a first embodiment of the present invention.

The view control device 1 includes the above described hardware resources and thus may execute the following process. FIG. 10 is an operation chart illustrating an operation flow of a view control process executed by a view control system according to a first embodiment of the present invention.

In operation S101, upon receiving a driver's request via a console panel (not illustrated) to download a structured document, the controller 17 of the view control device 1 establishes connection to a communication network by using the communicator 10. The controller 17 downloads and reads the structured document from the communication network by using the data reader 11.

In operation S102, the controller 17 extracts all link data described in the read structured document by using the link data extractor 12.

In operation S103, the controller 17 determines whether all of the extracted link data has been processed.

In operation S104, when it is determined that all of the extracted link data has been processed ("Yes" in operation S103), the controller 17 outputs the structured document and browsing data to the display manager 2 by using the resource data sender 16 and terminates the view control process.

When the controller 17 receives a new driver's request to download a new structured document, the controller 17 downloads the new structured document from the communication network and executes the view control process on the downloaded new structured document.

In operation S105, when it is determined that some of the extracted link data has not yet been processed ("No" in operation S103), the controller 17 reads browsing data stored in a linked site indicated by the next link data by using the linked site reader 13.

In operation S106, the controller 17 determines whether to regulate, in a moving vehicle, visible output of the read browsing data by using the regulation determiner 14. When it is determined to permit visible output of the browsing data in a moving vehicle ("Yes" in operation S106), the process returns to operation S103.

In operation S107, when it is determined to regulate visible output of the browsing data in a moving vehicle ("No" in operation S106), the controller 17 adds regulatory data to the structured document by using the view regulator 15. The process returns to operation S103.

Figure 11:
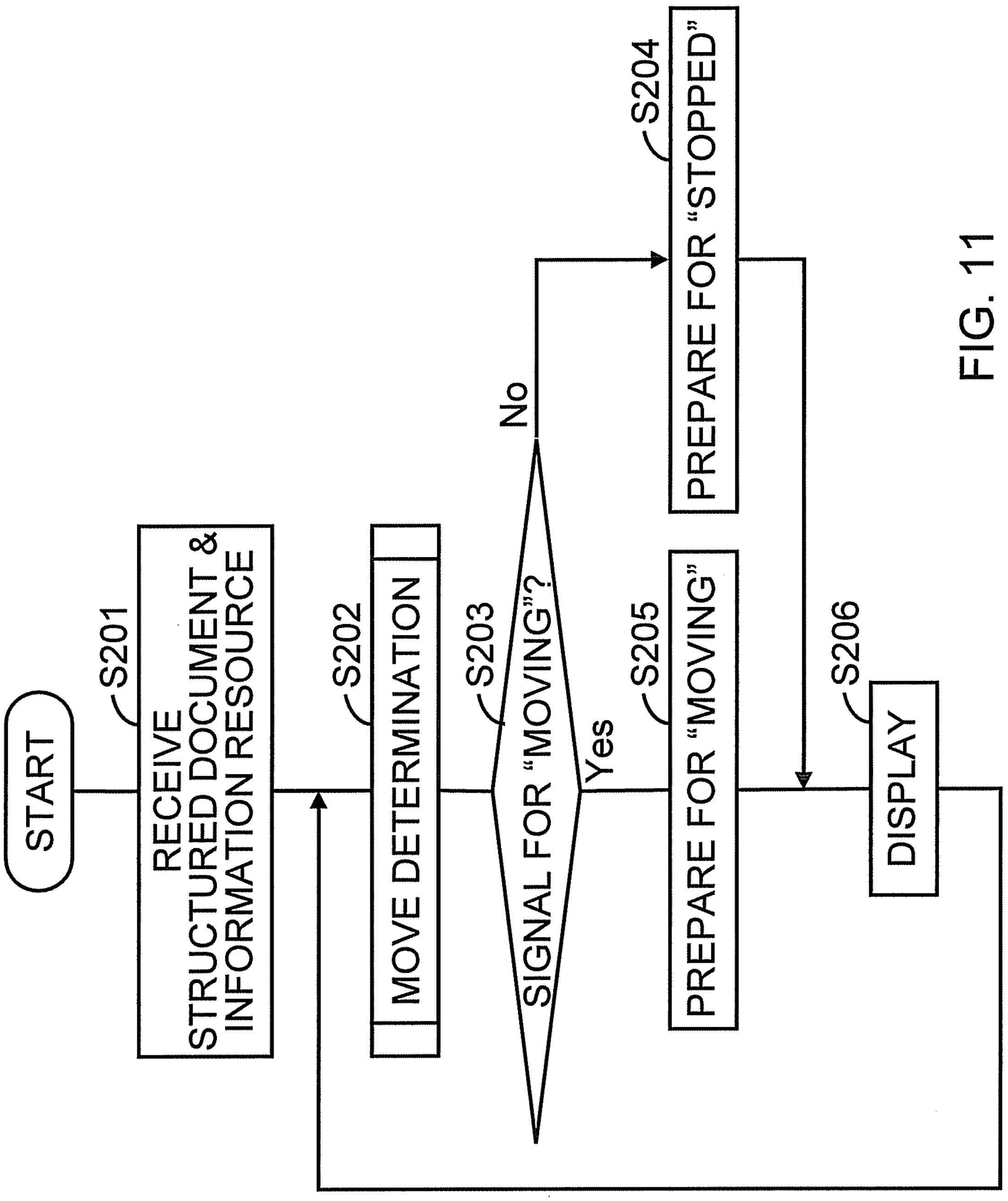
FIG. 11 is an operation chart illustrating an operation flow of an example of a view control process executed by a display manager according to a first embodiment of the present invention.

The display manager 2 executes the following process upon receiving a structured document output from the view control device 1. FIG. 11 is an operation chart illustrating an operation flow of an example of a view control process executed by a display manager according to a first embodiment of the present invention.

In operation S201, the display manager 2 receives plural kinds of structured documents and browsing data output from the view control device 1 by using the display controller 20.

In operation S202, the display manager 2 executes a move determination process for determining whether the vehicle is moving by using the move determiner 22. An operation flow of the move determination process will be discussed later.

In operation S203, the display manager 2 determines whether a control signal for "moving" has been output as a result of the move determination process.

In operation S204, when it is determined that the control signal for "moving" has not been output ("No" in operation S203), the display manager 2 prepares, by using the display controller 20, to display data of a structured document not associated with regulatory data, that is, data for a stopped vehicle. The process proceeds to operation S206.

In operation S205, when it is determined that the control signal for "moving" has been output ("Yes" in operation S203), the display manager 2 prepares, by using the display controller 20, to display data of a structured document associated with regulatory data, that is, data for a moving vehicle.

In operation S206, In each case of preparing for a stopped vehicle (operation S204) and for a moving vehicle (operation S205), the display manager 2 reads an appropriate structured document and outputs the read structured document to the display processor 23 by using the display controller 20. The display manager 2 displays a screen image generated in accordance with the structured document on a screen of the display device 81 by using the display processor 23, and the process returns to operation S202. Upon receiving a new structured document from the view control device 1, the display manager 2 terminates current view control process and starts new view control process for the new structured document.

Figure 12:
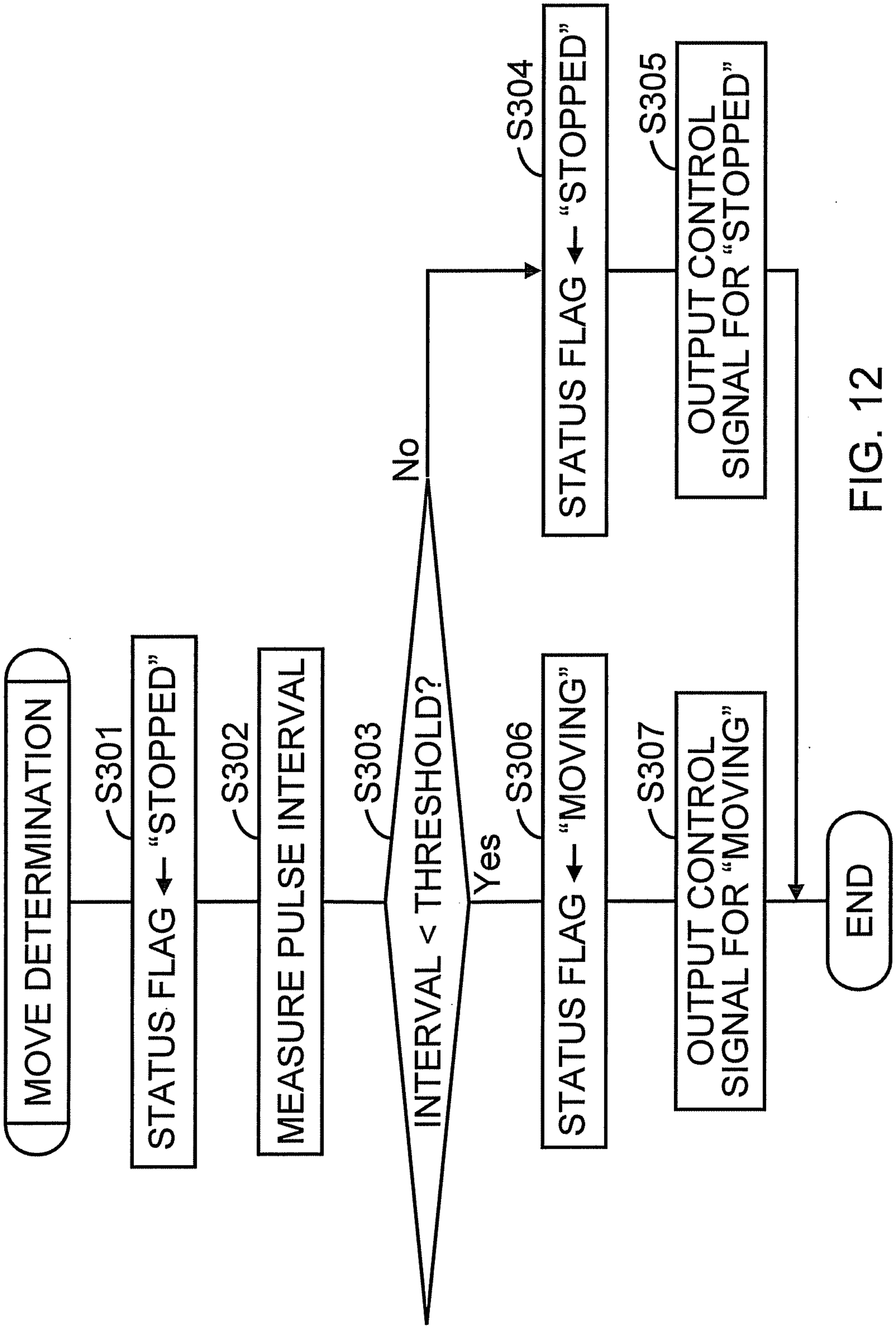
FIG. 12 is an operation chart illustrating an operation flow of an example of a move determination process executed by a display manager according to a first embodiment of the present invention.

The operation flow of the move determination process executed in operation S202 will be discussed. FIG. 12 is an operation chart illustrating an operation flow of an example of a move determination process executed by a display manager according to a first embodiment of the present invention.

In operation S301, the display manager 2 initializes the status flag stored by the move determiner 22 to "stopped".

In operation S302, the display manager 2 detects a pulse signal by using the status detector 21 and measures a pulse interval of detected pulse signal by using the move determiner 22.

In operation S303, the display manager 2 determines whether the measured pulse interval is shorter than a threshold value by using the move determiner 22.

In operation S304, when it is determined that the pulse interval is longer than or equals to the threshold value ("No" in operation S303), the display manager 2 updates the status flag to represent "stopped" by using the move determiner 22.

In operation S305, the display manager 2 generates a control signal for "stopped" and outputs generated control signal to the display controller 20 by using the move determiner 22. Then, the display manager 2 terminates the move determination process.

In operation S306, when it is determined that the measured pulse interval is shorter than the threshold value ("Yes" in operation S303), the display manager 2 updates the status flag to represent "moving" by using the move determiner 22.

In operation S307, the display manager 2 generates a control signal for "moving" and outputs the generated control signal to the display controller 20 by using the move determiner 22. Then, the display manager 2 terminates the move determination process.

According to the first embodiment of the present invention, it is possible to determine whether to display, in a moving vehicle, information resources stored in a linked site indicated by link data described in a structured document without placing unnecessary burden of operation on a driver. It is also possible to avoid displaying information undesirable to view while driving. It is further possible to improve browsing efficiency and to get information speedily.

Second Embodiment

Figure 13:
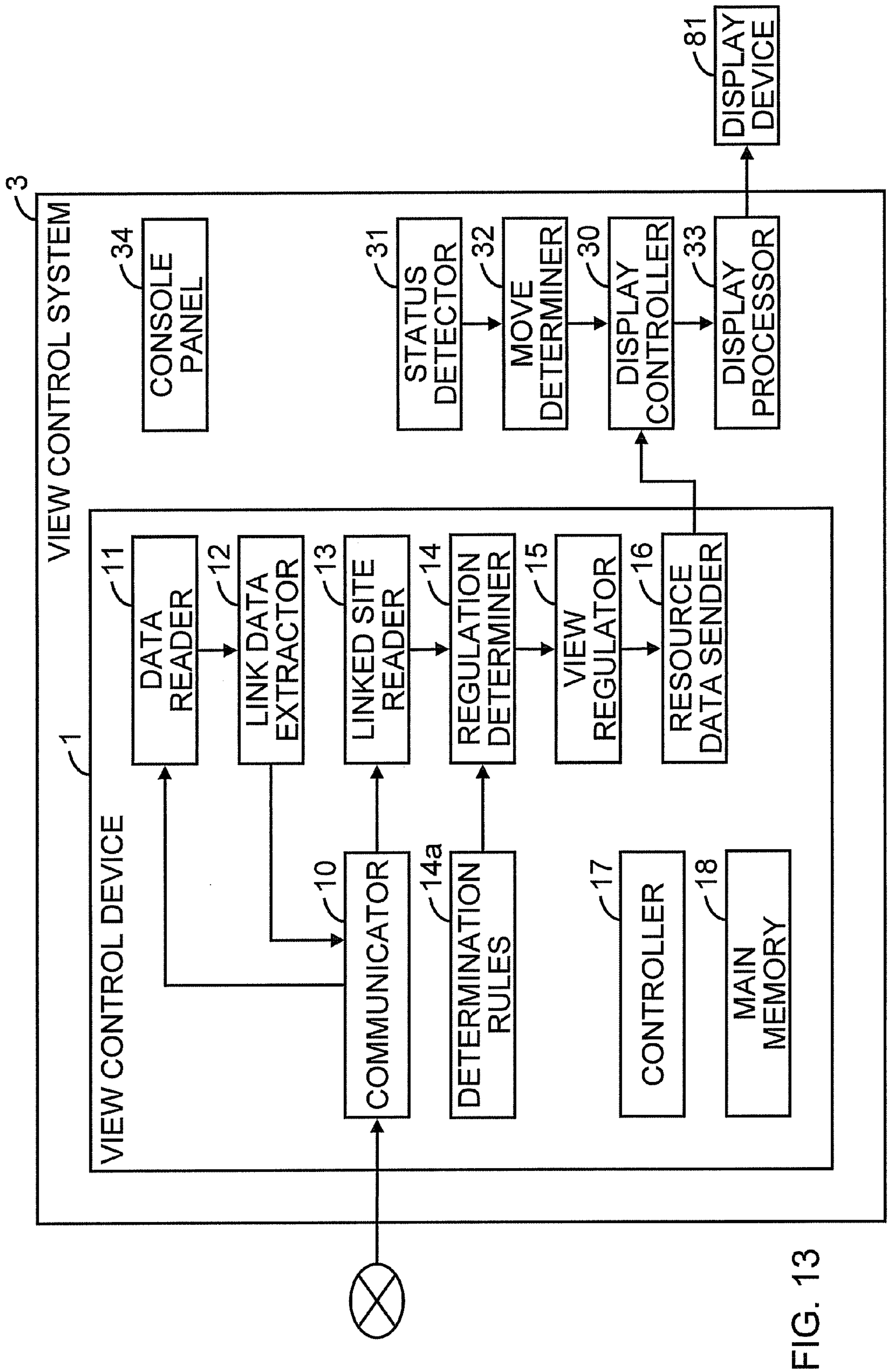
FIG. 13 is a block diagram illustrating an example of a configuration of a view control system according to a second embodiment of the present invention.

In the first embodiment of the present invention, the view control system is separated from the display processor and the display controller. In a second embodiment of the present invention, a view control system including a view control device, a display processor, and a display controller will be discussed. FIG. 13 is a block diagram illustrating an example of a configuration of a view control system according to a second embodiment of the present invention. The view control system 3 includes a view control device 1 similar to one discussed in the first embodiment of the present invention.

The configuration and operations of the view control device 1 of the view control system 3 according to the second embodiment of the present invention are similar to those in the first embodiment of the present invention. Thus, like portions are denoted by like reference numerals and a description thereof is omitted.

The view control system 3 corresponds to, for example, a car navigation system or an in-vehicle television receiver. The view control system 3 includes a display controller 30, a status detector 31, a move determiner 32, a display processor 33, and a console panel 34. The individual units are connected with one another through a communication line.

The display controller 30 selects an appropriate one from plural kinds of structured documents received from the view control device 1. The status detector 31 detects the vehicle status. The move determiner 32 determines whether the vehicle is moving in accordance with detected vehicle status. The display processor 33 sends data described in a structured document to a display device 81 mounted on the vehicle. The console panel 34 receives operation data input by a driver.

The status detector 31 corresponds to, for example, a speed sensor which detects a pulse signal for detecting a vehicle speed. The status detector 31 outputs the detected pulse signal to the move determiner 32.

The move determiner 32 measures a pulse interval of the pulse signal received from the status detector 31 to determine whether the measured pulse interval is shorter than a threshold value. When it is determined that the pulse interval is longer than or equals to the threshold value, the move determiner 32 determines that the vehicle is stopped and updates a status flag to represent "stopped". When it is determined that the pulse interval is shorter than the threshold value, the move determiner 32 determines that the vehicle is moving and updates the status flag to represent "moving". The move determiner 32 outputs a determination result to the display controller 30.

The display controller 30 receives and stores data such as a structured document output from the resource data sender 16 of the view control device 1. The display controller 30 also receives the determination result output from the move determiner 32. When the display controller 30 receives a determination result indicating that the vehicle is stopped, the display controller 30 reads the structured document not associated with regulatory data and outputs the read structured document to the display processor 33. When the display controller 30 receives a determination result indicating that the vehicle is moving, the display controller 30 reads the structured document associated with regulatory data and outputs the read structured document to the display processor 33.

The display processor 33 analyzes a description of the structured document by using a web browser to generate a screen image in accordance with the analysis result. The display processor 33 also activates application software for motion picture playback on the web browser and analyzes a motion picture file (browsing data) by using the activated application software to generate view data of a screen image to be sent to the display device 81. The display device 81 may include a liquid crystal panel and display received view data of the screen image thereon.

When the display processor 33 receives a structured document not associated with regulatory data from the display controller 30, the display processor 33 analyzes the received structured document by using a web browser and generates view data of a screen image to be displayed. On the display screen, characters indicating link data described in the structured document are displayed as underlined characters D8 (see FIG. 8).

When the display processor 33 receives a structured document associated with regulatory data from the display controller 30, the display processor 33 analyzes the received structured document by using a web browser and generates view data of a screen image to be displayed. On the display screen, characters D9 including characters indicating link data for the target linked site of regulation and "UNAVAILABLE WHILE MOVING" are displayed in addition to the underlined characters D8 (see FIG. 9).

The console panel 34 may include, for example, plural buttons and a lever and may be placed on a center console in the vehicle. The console panel 34 receives operation data input by a driver. The operation data includes a request to download a structured document, a request to download browsing data stored in a linked site, or a request to stop information output, for example. The console panel 34 outputs the received operation data to the controller 17. The controller 17 controls each unit in accordance with the received operation data.

The view control device 1 in the view control system 3 includes the above described hardware resources and thus may execute a process similar to the view control process executed by the view control device 1 according to the first embodiment of the present invention.

The view control system 3 includes the above described hardware resources and thus may execute processes similar to the view control process and move determination process executed by the display manager 2 in the first embodiment of the present invention.

Third Embodiment

Figure 14:
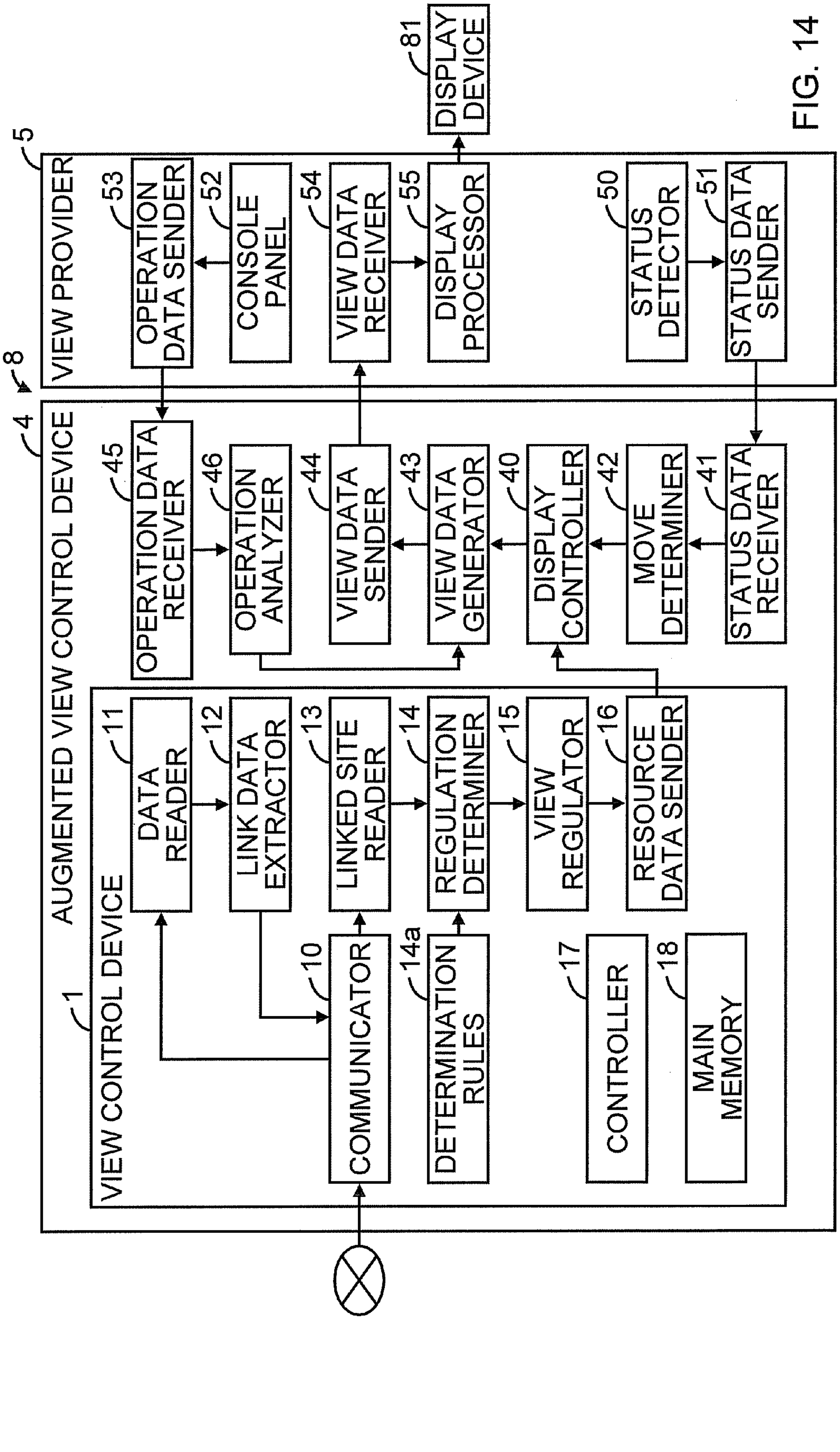
FIG. 14 is a block diagram illustrating an example of a configuration of a view control system according to a third embodiment of the present invention.

In the second embodiment of the present invention, the view control device, the display processor, and the display controller are integrated into the view control system. In a third embodiment of the present invention, a view control system including an augmented view control device and a view provider will be discussed. The augmented view control device includes a display controller, and the view provider includes a display processor. FIG. 14 is a block diagram illustrating an example of a configuration of a view control system according to a third embodiment of the present invention.

The view control system 8 according to the third embodiment of the present invention includes an augmented view control device 4 and a view provider 5. The augmented view control device 4 includes a view control device similar to one discussed in the first embodiment of the present invention.

The augmented view control device 4 includes a view control device 1 and a display controller 40. The view provider 5 includes a display processor 55. The augmented view control device 4 and the view provider 5 are connectable through a near field communication.

The configuration and operations of the view control device 1 of the view control system 8 according to the third embodiment of the present invention are similar to those in the first embodiment of the present invention. Thus, like portions are denoted by like reference numerals and a description thereof is omitted.

The augmented view control device 4 corresponds to, for example, a cell phone or personal digital assistant equipped with a communication function. The augmented view control device 4 includes the view control device 1, the display controller 40, a status data receiver 41, a move determiner 42, a view data generator 43, a view data sender 44, an operation data receiver 45, and an operation analyzer 46. The individual units are connected with one another through a communication line.

The display controller 40 selects an appropriate one from plural kinds of structured documents received from the view control device 1. The status data receiver 41 receives status data indicative of a vehicle status from the view provider 5. The move determiner 42 determines whether a vehicle is moving. The view data generator 43 generates view data of a screen image. The view data sender 44 sends a generated view data to the view provider 5. The operation data receiver 45 receives operation data from the view provider 5. The operation analyzer 46 analyzes received operation data.

The status data receiver 41 receives a pulse signal sent from the view provider 5 and outputs received pulse signal to the move determiner 42. The status data receiver 41 and the view provider 5 are connectable through near field communication such as infrared or Bluetooth communication.

The move determiner 42 measures a pulse interval of the pulse signal received from the status data receiver 41 to determine whether the measured pulse interval is shorter than a threshold value. When it is determined that the pulse interval is longer than or equals to the threshold value, the move determiner 42 determines that the vehicle is stopped and updates a status flag to represent "stopped". When it is determined that the pulse interval is shorter than the threshold value, the move determiner 42 determines that the vehicle is moving and updates the status flag to represent "moving". The move determiner 42 outputs a determination result to the display controller 40.

The display controller 40 receives and stores data such as a structured document output from the resource data sender 16 of the view control device 1. The display controller 40 also receives the determination result output from the move determiner 42. When the display controller 40 receives a determination result indicating that the vehicle is stopped, the display controller 40 reads the structured document not associated with regulatory data and outputs read structured document to the view data generator 43. When the display controller 40 receives a determination result indicating that the vehicle is moving, the display controller 40 reads the structured document associated with regulatory data and outputs the read structured document to the view data generator 43.

The operation data receiver 45 receives operation data sent from the view provider 5 and outputs the received operation data to the operation analyzer 46. The operation data receiver 45 and the view provider 5 are connectable through near field communication such as infrared or Bluetooth communication.

The operation analyzer 46 receives operation data output from the operation data receiver 45 and analyzes the received operation data. The operation data includes a request to download a structured document, a request to download browsing data stored in a linked site, or a request to stop information output, for example. The operation analyzer 46 outputs an analysis result to the view data generator 43.

The view data generator 43 receives plural kinds of structured documents output from the display controller 40. The view data generator 43 analyzes a description of the structured document by using a web browser to generate view data of a screen image in accordance with the analysis result. The view data generator 43 also activates application software for motion picture playback on the web browser and analyzes a motion picture file (browsing data) by using the activated application software to generate view data of a screen image. The view data generator 43 outputs generated view data to the view data sender 44.

The view data sender 44 receives the view data output from the view data generator 43 and sends received view data to the view provider 5. The view data sender 44 and the view provider 5 are connectable through near field communication such as infrared or Bluetooth communication.

The view provider 5 corresponds to, for example, a car navigation system or an in-vehicle television receiver. The view provider 5 is connectable with the augmented view control device 4 through near field communication. The view provider 5 includes a status detector 50, a status data sender 51, a console panel 52, an operation data sender 53, a view data receiver 54, and a display processor 55. The individual units are connected with one another through a communication line.

The status detector 50 detects a vehicle status. The status data sender 51 sends the detected vehicle status to the augmented view control device 4. The console panel 52 receives operation data input by a driver. The operation data sender 53 sends received operation data to the augmented view control device 4. The view data receiver 54 receives the view data sent from the augmented view control device 4. The display processor 55 sends received view data to the display device 81 mounted on the vehicle.

The status detector 50 corresponds to, for example, a speed sensor which detects a pulse signal for detecting a vehicle speed. The status detector 50 outputs the detected pulse signal to the status data sender 51.

The status data sender 51 receives the pulse signal output from the status detector 50 and sends received pulse signal to the status data receiver 41 of the augmented view control device 4.

The console panel 52 may include, for example, plural buttons and a lever and may be placed on a center console in the vehicle. The console panel 52 receives operation data input by a driver. The operation data includes a request to download a structured document, a request to download browsing data stored in a linked site, or a request to stop information output, for example. The console panel 52 outputs received operation data to the operation data sender 53.

The operation data sender 53 receives the operation data output from the console panel 52 and sends received operation data to the operation data receiver 45 of the augmented view control device 4.

The view data receiver 54 receives the view data sent from the view data sender 44 of the augmented view control device 4 and outputs received view data to the display processor 55.

The display processor 55 receives the view data output from the view data receiver 54 and sends received view data to the display device 81. When the display processor 55 receives view data generated from a structured document not associated with regulatory data, the display processor 55 sends characters indicating link data described in the structured document as underlined characters D8 (see FIG. 8). When the display processor 55 receives view data generated from a structured document associated with regulatory data, the display processor 55 sends characters D9 including characters indicating link data for the target linked site of regulation and "unavailable while moving" in addition to the underlined characters D8 (see FIG. 9).

The view control device 1 of the augmented view control device 4 includes the above described hardware resources and thus may execute a process similar to the view control process executed by the view control device 1 according to the first embodiment of the present invention.

Figure 15:
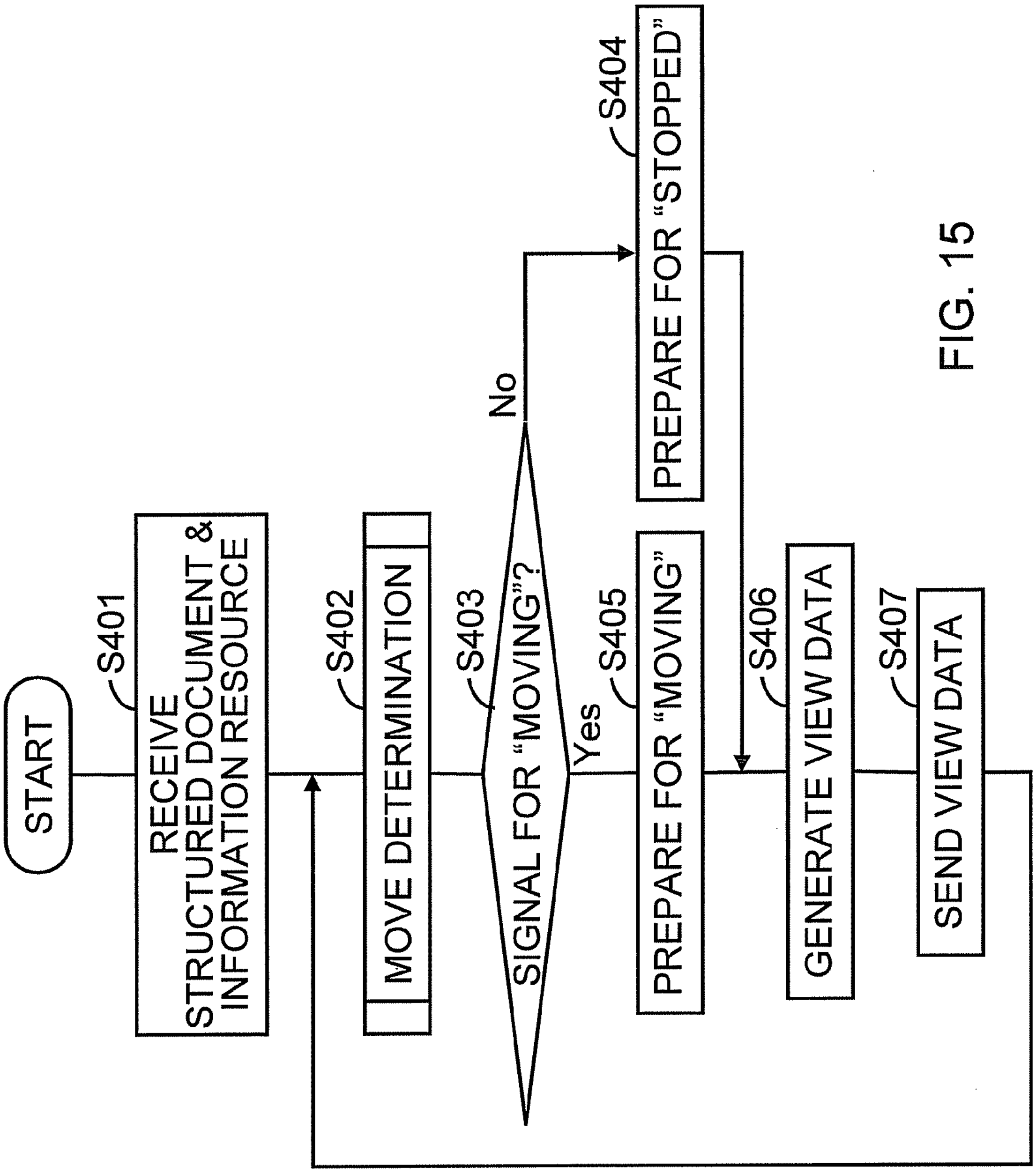
FIG. 15 is an operation chart illustrating an operation flow of an example of a view control process executed by an augmented view control device according to a third embodiment of the present invention.

The augmented view control device 4 includes the above described hardware resources and thus may execute the following view control process. FIG. 15 is an operation chart illustrating an operation flow of an example of a view control process executed by an augmented view control device according to a third embodiment of the present invention.

In operation S401, the augmented view control device 4 receives plural kinds of structured documents and browsing data output from the resource data sender 16 of the view control device 1 by using the display controller 40.

In operation S402, the augmented view control device 4 executes a move determination process for determining whether the vehicle is moving by using the move determiner 42. An operation flow of the move determination process will be discussed later.

In operation S403, the augmented view control device 4 determines whether a control signal for "moving" has been output as a result of the move determination process.

In operation S404, when it is determined that the control signal for "moving" has not been output ("No" in operation S403), the augmented view control device 4 prepares, by using the display controller 40, to display data of a structured document not associated with regulatory data, that is, data for a stopped vehicle. The process proceeds to operation S406.

In operation S405, when it is determined that the control signal for "moving" has been output "Yes" in operation S403), the augmented view control device 4 prepares, by using the display controller 40, to display data of a structured document associated with regulatory data, that is, data for a moving vehicle.

In operation S406, In each case of preparing for a stopped vehicle (operation S404) and for a moving vehicle (operation S405), the augmented view control device 4 generates view data of a screen image for prepared structured document by using the view data generator 43.

In operation S407, the augmented view control device 4 sends the generated view data to the view provider 5. Then the process returns to operation S402.

Figure 16:
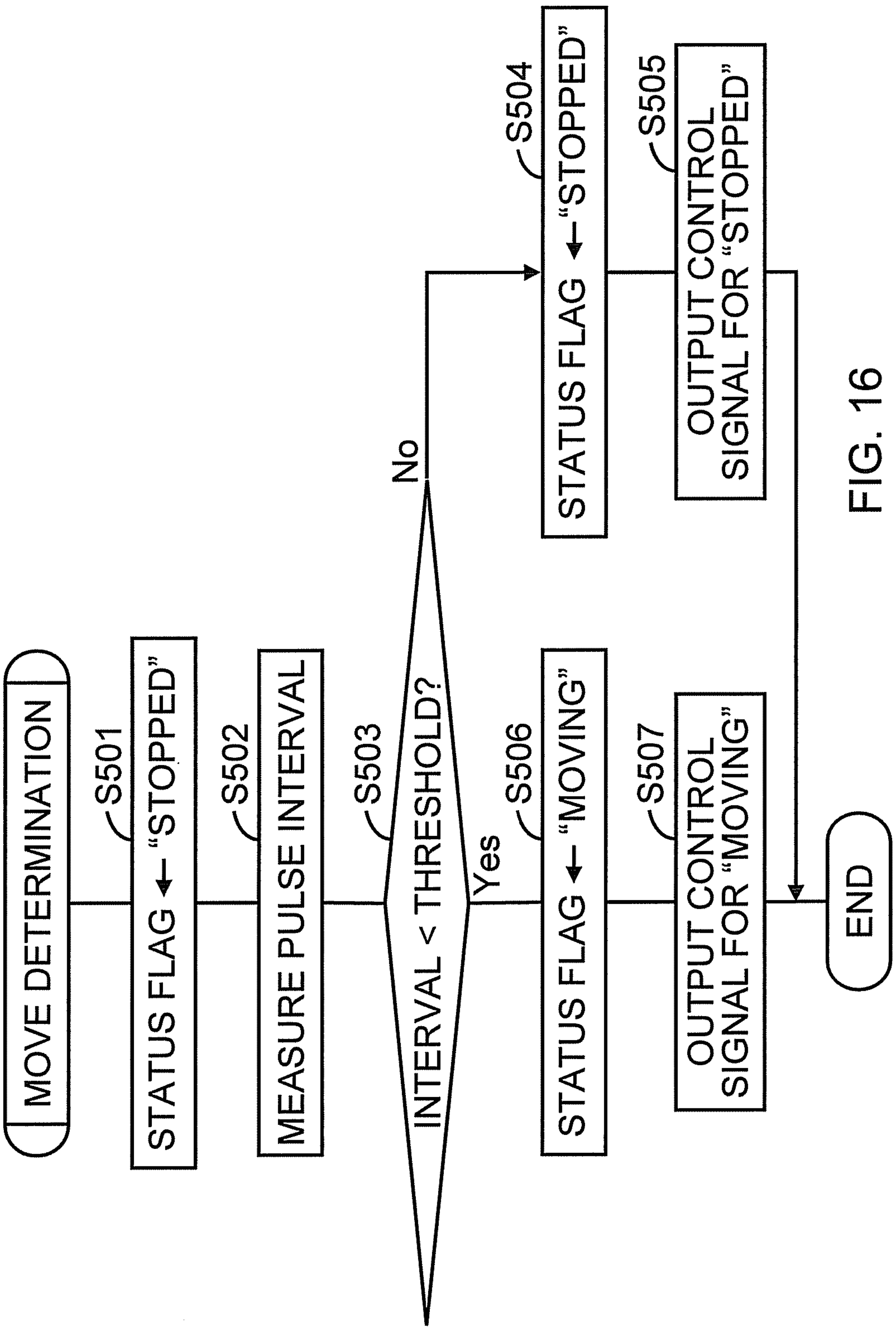
FIG. 16 is an operation chart illustrating an operation flow of an example of a move determination process executed by an augmented view control device according to a third embodiment of the present invention.

The operation flow of the move determination process executed in operation S402 will be discussed. FIG. 16 is an operation chart illustrating an operation flow of an example of a move determination process executed by an augmented view control device according to a third embodiment of the present invention.

In operation S501, the augmented view control device 4 initializes the status flag stored by the move determiner 42 to "stopped".

In operation S502, the augmented view control device 4 detects, by using the status data receiver 41, a pulse signal sent from the view provider 5 and measures a pulse interval of the detected pulse signal by using the move determiner 42.

In operation S503, the augmented view control device 4 determines whether the measured pulse interval is shorter than a threshold value by using the move determiner 42.

In operation S504, when it is determined that the pulse interval is longer than or equals to the threshold value "No" in operation S503), the augmented view control device 4 updates the status flag to represent "stopped" by using the move determiner 42.

In operation S505, the augmented view control device 4 generates a control signal for "stopped" and outputs the generated control signal to the display controller 40 by using the move determiner 42. Then, the augmented view control device 4 terminates the move determination process.

In operation S506, when it is determined that the measured pulse interval is shorter than the threshold value ("Yes" in operation S503), the augmented view control device 4 updates the status flag to represent "moving" by using the move determiner 42.

In operation S507, the augmented view control device 4 generates a control signal for "moving" and outputs the control signal to the display controller 40 by using the move determiner 42. Then, the augmented view control device 4 terminates the move determination process.

In the third embodiment of the present invention, the view provider 5 includes units only for displaying information to thereby downsize the viewer to be mounted in the vehicle and prevent the viewer from narrowing an inner space of the vehicle.

Fourth Embodiment

Figure 17:
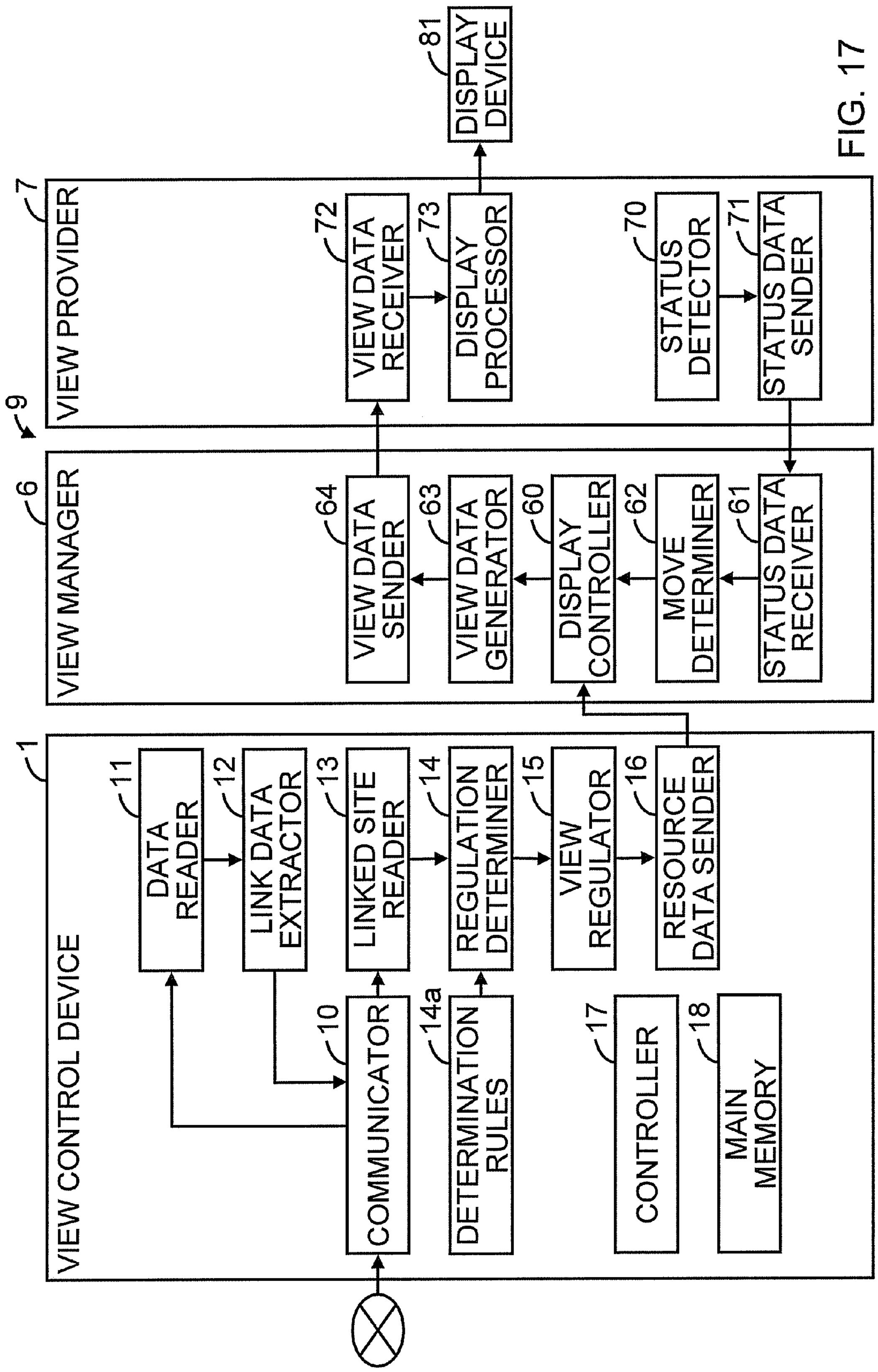
FIG. 17 is a block diagram illustrating an example of a configuration of a view control system according to a fourth embodiment of the present invention.

In the third embodiment of the present invention, the view control system includes the augmented view control device and the view provider. The augmented view control device includes the display controller. The view provider includes the display processor. In a fourth embodiment of the present invention, a view control system including a view control device, a view manager, and a view provider will be discussed. The view manager includes a display controller, and the view provider includes a display processor. FIG. 17 is a block diagram illustrating an example of a configuration of a view control system according to a fourth embodiment of the present invention. The view control system 9 includes a view control device 1 similar to one discussed in the first embodiment of the present invention.

The view control system 9 according to the fourth embodiment of the present invention includes the view control device 1, a view manager 6, and a view provider 7.

The view manager 6 includes a display controller 60, and the view provider 7 includes a display processor 73. The view control device 1 and the view manager 6 are connected through a communication network. The view manager 6 and the view provider 7 are connected through a near field communication.

The view control device 1 of the view control system 9 according to the fourth embodiment of the present invention corresponds to a control server installed in a control center. The configuration and operations of the view control device 1 in the fourth embodiment of the present invention are similar to those in the first embodiment of the present invention. Thus, like portions are denoted by like reference numerals and a description thereof is omitted.

The view manager 6 corresponds to, for example, a cell phone or personal digital assistant equipped with a communication function. The view manager 6 includes a display controller 60, a status data receiver 61, a move determiner 62, a view data generator 63, and a view data sender 64. The individual units are connected with one another through a communication line.

The display controller 60 selects an appropriate one from plural kinds of structured documents received from the view control device 1. The status data receiver 61 receives status data indicative of a vehicle status from the view provider 7. The move determiner 62 determines whether a vehicle is moving. The view data generator 63 generates view data of a screen image. The view data sender 64 sends a generated view data to the view provider 7.

The status data receiver 61 receives a pulse signal sent from the view provider 7 and outputs the received pulse signal to the move determiner 62. The status data receiver 61 and the view provider 7 are connectable through near field communication such as infrared or Bluetooth communication.

The move determiner 62 measures a pulse interval of the pulse signal received from the status data receiver 61 to determine whether the measured pulse interval is shorter than a threshold value. When it is determined that the pulse interval is longer than or equals to the threshold value, the move determiner 62 determines that the vehicle is stopped and updates a status flag to represent "stopped". When it is determined that the pulse interval is shorter than the threshold value, the move determiner 62 determines that the vehicle is moving and updates the status flag to represent "moving". The move determiner 62 outputs a determination result to the display controller 60.

The display controller 60 includes a modem connectable to the Internet, for example. The display controller 60 receives and stores data such as a structured document output from the resource data sender 16 of the view control device 1. The display controller 60 also receives a determination result output from the move determiner 62. When the display controller 60 receives a determination result indicating that the vehicle is stopped, the display controller 60 reads the structured document not associated with regulatory data and outputs read structured document to the view data generator 63. When the display controller 60 receives a determination result indicating that the vehicle is moving, the display controller 60 reads the structured document associated with regulatory data and outputs read structured document to the view data generator 63.

The view data generator 63 receives plural kinds of structured documents output from the display controller 60. The view data generator 63 analyzes a description of the structured document by using a web browser to generate view data of a screen image in accordance with the analysis result. The view data generator 63 also activates application software for motion picture playback on the web browser and analyzes a motion picture file (browsing data) by using the activated application software to generate view data of a screen image. The view data generator 63 outputs the generated view data to the view data sender 64.

The view data sender 64 receives the view data output from the view data generator 63 and sends received view data to the view provider 7. The view data sender 64 and the view provider 7 are connectable through near field communication such as infrared or Bluetooth communication.

The view provider 7 and the view manager 6 are connectable through near field communication. The view provider 7 includes a status detector 70, a status data sender 71, a view data receiver 72, and a display processor 73. The individual units are connected with one another through a communication line.

The status detector 70 detects a vehicle status. The status data sender 71 sends detected vehicle status to the view manager 6. The view data receiver 72 receives the view data sent from the view manager 6. The display processor 73 sends received view data to the display device 81 mounted on the vehicle.

The status detector 70 corresponds to, for example, a speed sensor which detects a pulse signal for detecting a vehicle speed. The status detector 70 outputs the detected pulse signal to the status data sender 71.

The status data sender 71 receives the pulse signal output from the status detector 70 and sends received pulse signal to the status data receiver 61 of the view manager 6.

The view data receiver 72 receives the view data sent from the view data sender 64 of the view manager 6 and outputs received view data to the display processor 73.

The display processor 73 receives the view data output from the view data receiver 72 and sends received view data to the display device 81. When the display processor 73 receives view data generated from a structured document not associated with regulatory data, the display processor 73 sends characters indicating link data described in the structured document as underlined characters D8 (see FIG. 8). When the display processor 73 receives view data generated from a structured document associated with regulatory data, the display processor 73 sends characters D9 including characters indicating link data for the target linked site of regulation and "unavailable while moving" in addition to the underlined characters D8 (see FIG. 9).

The view control device 1 according to the fourth embodiment of the present invention includes the above described hardware resources and thus may execute a process similar to the view control process executed by the view control device 1 according to the first embodiment of the present invention.

The view manager 6 includes the above described hardware resources and thus may execute processes similar to the view control process and the move determination process executed by the augmented view control device 4 according to the third embodiment of the present invention.

In the fourth embodiment of the present invention, the view provider 7 includes units only for displaying information to thereby downsize the viewer to be mounted in the vehicle and prevent the viewer from narrowing an inner space of the vehicle. Further, the view manager 6 includes units only for controlling visible output to thereby downsize the view manager and maintain its portability.

The above described embodiments discuss an example where the view regulator 15 adds regulatory data as an HTML comment. Instead, the link data table T may be provided with a column for flags indicative of "unavailable while moving" and the flag may be updated to "true" by the view regulator 15 when visible output of corresponding browsing data determined to be regulated.

The above described embodiments discuss the status detector 21 (31, 50, or 70) as a speed sensor for detecting a vehicle speed by way of example. Instead, a parking brake sensor for detecting ON/OFF status of a parking brake lever that applies a brake to a parked vehicle may be used. In this case, the status detector 21 (31, 50, or 70) may output an "ON" signal to the move determiner 22 (32, 42, or 62) when the parking brake lever is switched ON to brake the vehicle. Upon receiving the "ON" signal, the move determiner 22 (32, 42, or 62) may determine that the vehicle is stopped. On the other hand, the status detector 21 (31, 50, or 70) may output an "OFF" signal to the move determiner 22 (32, 42, or 62) when the parking brake lever is switched OFF. Upon receiving the "OFF" signal, the move determiner 22 (32, 42, or 62) may determine that the vehicle is moving.

The above described embodiments discuss the status detector 21 (31, 50, or 70) as a speed sensor for detecting a vehicle speed by way of example. Instead, the status detector 21 (31, 50, or 70) may be a global positioning system (GPS) receiver that gets data about a vehicle position. In this case, the move determiner 22 (32, 42, or 62) may determine whether the vehicle is moving in accordance with a shift of the vehicle position.

In the above discussed embodiments, the display controller 20 (30, 40, or 60) receives and stores plural kinds of structured documents from the resource data sender 16, and upon each determination process in the move determiner 22 (32, 42, or 62), a structured document corresponding to a determination result is read to be displayed. Instead, the display controller 20 (30, 40, or 60) may receive and display a structured document corresponding to a determination result from the resource data sender 16 upon each determination process in the move determiner 22 (32, 42, or 62).

The above described embodiments discuss an example where the augmented view control device 4 (or the view manager 6) and the view provider 5 (or 7) are connectable through near field communication. Instead, these devices may be connected through a communication line.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A view control system communicably connectable to a display device, the view control system comprising:

a view control device including:

a regulation determiner that determines whether to regulate, when a predefined condition is satisfied, visible output of an information resource, and a view regulator that associates regulatory data with the information resource in resource data analyzable for generation of view data, for an indication that visible output of the information resource is regulated, according to the determination of the regulation determiner;

a display controller that analyzes the resource data, including the indication for the information resource associated with the regulatory data, to generate view data for a display which avoids, when the predefined condition is satisfied, generation of view data from the information resource associated with the regulatory data in the resource data;

a data reader that receives as the resource data a structured document containing link data indicative of a site where the information resource is stored;

a link data extractor that extracts the link data contained in a received structured document; and a linked site reader that receives the information resource stored in the site indicated by the link data to send received information resource to the regulation determiner;

wherein the regulation determiner determines whether to regulate, when the predefined condition is satisfied, visible output of the link data for the information resource, the view regulator associates the regulatory data with the link data for the information resource upon the regulation determiner determining to regulate, when the predefined condition is satisfied, visible output of the information resource, and the view control system is mountable on a vehicle, the display device being for providing visible output of information and the predefined condition is that the vehicle is moving according to a move determiner.

2. The view control system according to claim 1, wherein the move determiner and the display controller are included in the view control device, and the display controller receives resource data sent from a resource data sender, the view control device further including:

a view data generator that generates the view data in accordance with the structured document and the information resource, a view data sender that sends the generated view data, a status data receiver that receives status data capable of indicating a status of the vehicle, wherein the move determiner determines whether the vehicle is moving in accordance with status data received from the status data receiver, and the display controller controls the view data generator to:

generate view data in accordance with an information resource associated with the regulatory data upon the move determiner determining that the vehicle is moving, and generate view data in accordance with an information resource without the regulatory data upon the move determiner determining that the vehicle is stopped, the view control system further comprising:

a view provider including:

a view data receiver that receives the view data sent from the view data sender, a display processor that sends received view data to the display device, a status detector that detects a status of the vehicle to generate status data indicating a detected status, a status data sender that sends generated status data to the status data receiver.

3. The view control system according to claim 1, wherein the view regulator adds the regulatory data to an element of the structured document, the element defining the link data to be regulated.

4. The view control system according to claim 1, wherein the view regulator generates a table storing the link data added with the regulatory data, the link data stored in the table being associated with location data of an element defining the link data in the structured document.

5. The view control system according to claim 1, further comprising:

a view manager including:

the display controller, a view data generator that generates the view data in accordance with the structured document and the information resource, a view data sender that sends the generated view data, a status data receiver that receives status data capable of indicating a status of the vehicle, and the move determiner that determines whether the vehicle is moving in accordance with status data received from the status data receiver, wherein the display controller controls the view data generator to:

generate view data in accordance with an information resource associated with the regulatory data upon determining that the vehicle is moving, and generate view data in accordance with an information resource without the regulatory data upon determining that the vehicle is stopped; and a view provider including:

a view data receiver that receives the view data sent from the view data sender, a display processor that sends received view data to the display device, a status detector that detects a status of the vehicle to generate status data indicating a detected status, a status data sender that sends generated status data to the status data receiver.

6. The view control system of claim 1, further comprising:

a display processor that outputs the generated view data to the display device, the view data generated in accordance with the structured document and the information resource.

7. A non-transitory computer-readable recording medium storing a program that causes one or more devices to execute a view control method, including:

receiving a structured document containing link data indicative of a site where the information resource is stored;

extracting the link data contained in a received structured document;

receiving the information resource stored in the site indicated by the link data;

determining whether to regulate, when a predefined condition is satisfied, visible output of the information resource;

associating, in the structured document, regulatory data with the link data of the information resource, upon determining to regulate, when the predefined condition is satisfied, visible output of the information resource; and analyzing the structured document to generate, for a display, view data which avoids, when the predetermined condition is satisfied, generation of view data from the link data of the information resource associated with the regulatory data in the structured document, wherein the display is mountable for a vehicle and the predefined condition is that the vehicle is moving according to a move determiner.

8. A view control method executed by a view control system communicably connected to a display device the view control method comprising:

receiving, by the view control system, a structured document containing link data indicative of a site where information resource is stored;

extracting the link data contained in a received structured document;

receiving the information resource stored in the site indicated by the link data;

determining whether to regulate, when a predefined condition is satisfied, visible output of the information resource;

associating, in the structured document, regulatory data with the link data of the information resource upon determining to regulate, when the predefined condition is satisfied, visible output of the information resource; and analyzing the structured document to generate, for a display, view data which avoids, when the predetermined condition is satisfied, generation of view data from the link data of the information resource associated with the regulatory data in the structured document, wherein the display device is mountable for a vehicle and the predefined condition is that the vehicle is moving according to a move determiner.

* * * * *